US012438621B2

(12) United States Patent
Oh et al.

(10) Patent No.: US 12,438,621 B2
(45) Date of Patent: Oct. 7, 2025

(54) COHERENT OPTICAL COMMUNICATION SYSTEM USING POLARIZATION TIME BLOCK CODE

(71) Applicant: ELECTRONICS AND TELECOMMUNICATIONS RESEARCH INSTITUTE, Daejeon (KR)

(72) Inventors: Jung-yeol Oh, Sejong-si (KR); Hun Sik Kang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 256 days.

(21) Appl. No.: 18/238,259

(22) Filed: Aug. 25, 2023

(65) Prior Publication Data
US 2024/0187105 A1 Jun. 6, 2024

(30) Foreign Application Priority Data

Dec. 2, 2022 (KR) .................. 10-2022-0166750

(51) Int. Cl.
*H04B 10/06* (2006.01)
*H04B 10/532* (2013.01)
*H04B 10/61* (2013.01)

(52) U.S. Cl.
CPC ....... *H04B 10/6162* (2013.01); *H04B 10/532* (2013.01)

(58) Field of Classification Search
CPC .............. H04B 10/6162; H04B 10/532; H04B 10/6165; H04B 10/6164; H04B 10/6163; H04B 10/40; H04B 10/613; H04B 10/614; H04B 10/516; H04B 10/548; H04B 10/0795; H04B 10/2507; H04B 10/2569; H04J 14/06
USPC ....... 398/202, 203, 204, 205, 206, 207, 208, 398/209, 135, 136, 183, 184, 188, 65, 398/152, 147, 33, 38, 25, 26, 27, 158, 398/159

See application file for complete search history.

(56) References Cited

U.S. PATENT DOCUMENTS 7,555,227 B2 * 6/2009 Bontu .................... H04B 10/60
398/202
9,020,364 B2 * 4/2015 Xie .................... H04B 10/6165
398/202

(Continued)

FOREIGN PATENT DOCUMENTS

KR  10-2018-0078014 A  7/2018

OTHER PUBLICATIONS

Md. Saifuddin Faruk et al., "DSP algorithms for recovering single-carrier Alamouti coded signals for PON applications", Optics Express 24083, vol. 24, No. 21 | Oct. 17, 2016.

(Continued)

*Primary Examiner* — Hanh Phan
(74) *Attorney, Agent, or Firm* — LRK PATENT LAW FIRM

(57) ABSTRACT

Provided is a coherent optical communication system including a coherent optical transmitter and a coherent optical receiver, and more particularly, when a polarization time block code is used, the complexity for performing a polarization time block decoding scheme of the coherent optical receiver is minimized.

14 Claims, 7 Drawing Sheets

(56) References Cited

U.S. PATENT DOCUMENTS

| | | |
|---|---|---|
| 2006/0093049 A1 | 5/2006 | Jensen et al. |
| 2007/0036555 A1 | 2/2007 | Chen et al. |
| 2011/0064422 A1 | 3/2011 | Kim et al. |
| 2011/0150478 A1 | 6/2011 | Winzer et al. |
| 2011/0243561 A1 | 10/2011 | Li et al. |
| 2012/0070149 A1 | 3/2012 | Chung et al. |
| 2015/0372764 A1* | 12/2015 | Kaneda ................ H04B 10/616 398/115 |
| 2016/0204871 A1 | 7/2016 | Li et al. |
| 2020/0374011 A1 | 11/2020 | Zhou et al. |

OTHER PUBLICATIONS

Md. Saifuddin Faruk et al., "Technology Requirements for an Alamouti-Coded 100 GB/s Digital Coherent Receiver Using 3 x 3 Couplers for Passive Optical Networks", IEEE Photonics Journal, vol. 10, No. 1, Feb. 2018.

M. Sezer Erkilinc et al., "Polarization-Insensitive Single Balanced Photodiode Coherent Receiver for Passive Optical Networks", Ecoc 2015—ID: 0229.

* cited by examiner

COHERENT OPTICAL COMMUNICATION SYSTEM USING POLARIZATION TIME BLOCK CODE

CROSS-REFERENCE TO RELATED APPLICATION

This application claims the benefit of Korean Patent Application No. 10-2022-0166750 filed on Dec. 2, 2022, in the Korean Intellectual Property Office, the entire disclosure of which is incorporated herein by reference for all purposes.

BACKGROUND

1. Field of the Invention

One or more embodiments relate to a coherent optical communication system, and more particularly, to a coherent optical communication system for reducing the implementation complexity using a polarization time block code.

2. Description of Related Art

A coherent optical communication system provides high channel capacity, high spectral efficiency, and high received sensitivity compared to an optical communication system using intensity modulation/direct detection according to the related art. In addition, a coherent optical communication system has advantages of easy implementation of wavelength division multiplexing (WDM) with high-frequency selectivity and easy compensation for a chromatic dispersion effect, which is an obstacle in high-speed implementation, using a digital signal processor (DSP).

However, a polarization state of the signal transmitted from a coherent optical transmitter is randomly changed due to birefringence occurring in an optical fiber. Accordingly, a coherent optical receiver must use a coherent receiver having a dual polarization structure having a polarization diversity function that may receive the transmitted signals regardless of the polarization state of the signal output from the optical fiber. However, a polarization diversity coherent receiver having such a dual polarization structure has disadvantages in that it is not easy to lower the cost thereof because many optical components are used and it is difficult to reduce the size the polarization diversity coherent receiver having a dual polarization structure because it is not easy to integrate polarization components.

As a method to reduce the complexity of such a coherent receiver, a polarization time block coding scheme using an Alamouti code that encodes two adjacent symbols in the time domain to be orthogonal to each other for X and Y polarization modes is proposed when an optical transmitter generates a transmission signal. The Alamouti code-based polarization time block coding scheme may realize a structure of an optical receiver as a structure of a receiver having a single polarization structure instead of a dual polarization structure, and accordingly, there is an advantage of significantly reducing optical components compared to a polarization diversity coherent receiver according to the related art.

FIG. 1 is an Alamouti code-based polarization time block coding structure according to the related art and transmission signals $x_1$ and $x_2$ to be transmitted are encoded in a polarization and a time domain through the following processes. In detail, in an odd-numbered symbol interval, the symbol $x_1$ is transmitted in an X polarization and the symbol $x_2$ is transmitted in a Y polarization. In addition, in an even-numbered symbol interval, a symbol $-x_2^*$ is transmitted in the X polarization and a symbol $x_1^*$ is transmitted in the Y polarization. Here, $(-)^*$ refers to a complex conjugate operation.

Accordingly, the pair of symbols $x_1$ and $x_2$ and the pair of symbols $-x_2^*$ and $x_1^*$ adjacent to each other have orthogonal properties to each other, the transmitted symbols are input to an optical receiver through an optical fiber, and when defining a channel coefficient $h_1$ for an X polarization mode and a channel coefficient $h_2$ for a Y polarization mode, an odd-numbered received symbol $y_1$ and a result $y_2^*$ of performing a complex conjugate on an even-numbered received symbol $y_2$ is defined as shown in Equation 1 below.

$$y_1 = [h_1 \; h_2]\begin{bmatrix} x_1 \\ x_2 \end{bmatrix} + n_1 \quad \text{[Equation 1]}$$

$$y_2^* = [h_2^* \; -h_1^*]\begin{bmatrix} x_1 \\ x_2 \end{bmatrix} + n_2^*$$

Here, $n_1$ and $n_2$ denote noise generated in each polarization mode channel. When received symbols are combined, Equation 1 may be converted into a 2×2 multiple input multiple output (MIMO) as shown in Equation 2 below.

$$\begin{bmatrix} y_1 \\ y_2^* \end{bmatrix} = \begin{bmatrix} h_1 & h_2 \\ h_2^* & -h_1^* \end{bmatrix}\begin{bmatrix} x_1 \\ x_2 \end{bmatrix} + \begin{bmatrix} n_1 \\ n_2^* \end{bmatrix} \quad \text{[Equation 2]}$$

FIGS. 2A and 2B illustrate a structure of a polarization time block code decoder performed in a digital signal processor (DSP) of an optical receiver, according to the related art. Here, FIG. 2A illustrates a structure of dividing an input symbol into an odd-numbered term and an even-numbered term, performing a complex conjugate operation on the even-numbered term, performing channel compensation through four digital filters including a 2×2 MIMO multi-tap for channel coefficient compensation, and performing phase restoration through the four following phase compensators.

In addition, FIG. 2B illustrates a structure of reducing the complexity of multi-tap digital filters by disposing a digital filter for channel compensation in front and performing a polarization time block code decoding with single-tap digital filters in the back.

In this way, the polarization time block code decoder according to the related art described above has at least four digital filters for channel compensation, four phase compensators for phase restoration, and their channel equalizers for updating coefficients of each of the digital filters and the phase compensators. These components of such a polarization time block decoder account for a large portion of the complexity of the entire DSP for the receiver.

Accordingly, a polarization time block code decoder that minimizes the complexity of the entire receiver DSP is required.

SUMMARY

Embodiments may realize a single polarization coherent optical receiver by performing a polarization time block code based on the orthogonal code provided in the present disclosure in a coherent optical transmitter. A coherent optical receiver having a single polarization structure may significantly reduce the number of optical components compared to a coherent optical receiver having a dual polarization structure.

Embodiments provide, by a polarization time block code decoder, a coherent optical receiver DSP that reduces the number of digital filters, the number of channel equalizers, and the number of phase compensators required for a polarization time block code decoding compared to the Alamouti code-based polarization time block code scheme according to the related art.

According to an aspect, there is provided a coherent optical receiver including a digital filter configured to compensate for a channel effect of complex received symbols received from a coherent optical transmitter using a channel coefficient of a digital filter updated through an equalization algorithm, wherein the digital filter is a multi-tap digital filter having a multi-tap or a single-tap digital filter having a single-tap and includes a first digital filter not interworking with a complex conjugate block and a second digital filter interworking with a complex conjugate block, a symbol delayer configured to set a delay period of a symbol, wherein the symbol delayer includes a first symbol delayer interworking with the first digital filter and a second symbol delayer interworking with the second digital filter, a complex adder configured to perform a complex addition operation on complex symbols for which a time delay is set through the symbol delayer and complex symbols that passes through the digital filter, wherein the complex adder includes a first complex adder interworking with the first symbol delayer and a second complex adder interworking with the second symbol delayer, a channel equalizer configured to correct coefficients of the digital filters according to a channel change using complex received symbols and a parallel-to-serial converter configured to convert symbols in series. The coherent optical transmitter is configured to place a first transmission symbol and a second transmission symbol including a symbol pair in an X polarization and a Y polarization in an odd-numbered symbol interval, respectively and place the first transmission symbol and the second transmission symbol to cross each other to be different from a position of a transmission symbol that is placed in the odd-numbered symbol interval for the X polarization and the Y polarization in an even-numbered symbol interval, and then perform a negative operation on a transmission symbol placed in the X polarization in the even-numbered symbol interval and perform a complex conjugate operation on a transmission symbol placed in one polarization of X or Y.

In the first digital filter, a complex received symbol input from the optical fiber may be placed, and in the second digital filter, a complex received symbol obtained by performing a complex conjugate operation through the complex conjugate block may be placed.

The symbol delayers may be configured to delay each complex received symbols that passes through the digital filters by one symbol period.

The first complex adder may be configured to perform a complex addition operation on a complex received symbol in the odd-numbered symbol interval for which a time delay is set through the first symbol delayer and the first digital filter and on a complex received symbol in an even-numbered symbol interval on which a complex conjugate operation is performed through the complex conjugate block and the second digital filter.

The second complex adder may be configured to perform a negative operation on an even-numbered symbol interval complex received symbol in an even-numbered symbol interval on which a complex conjugate operation is not performed through the first digital filter and perform a complex addition operation on a complex received symbol on which the negative operation is performed and on a complex received symbol in an odd-numbered symbol interval on which a complex conjugate operation is performed through the complex conjugate block and the second digital filter.

The coherent optical receiver may further include a phase compensator configured to restore a phase of a complex received symbol for which the channel effect is compensated for through the digital filter. The phase compensator may include a first phase compensator interworking with the first digital filter and a second phase compensator interworking with the second digital filter to perform a phase compensation operation. The first phase compensator and the second phase compensator may be configured to receive a phase compensation coefficient through the channel equalizer.

The coherent optical receiver may further include a channel compensator configured to compensate for the channel effect of the complex received symbol. The channel compensator may be configured to receive a channel coefficient of a digital filter updated according to a channel change through the channel equalizer.

According to an aspect, there is provided a coherent optical transmitter including a polarization time block coder configured to place a first transmission symbol and a second transmission symbol including a symbol pair in an X polarization and a Y polarization in an odd-numbered symbol interval, respectively, and place the first transmission symbol and the second transmission symbol to cross each other to be different from a position of a transmission symbol that is placed in the odd-numbered symbol interval for the X polarization and the Y polarization in an even-numbered symbol interval, perform a negative operation on a transmission symbol placed in the X polarization in the even-numbered symbol interval, and perform a complex conjugate operation on a transmission symbol placed in one of the X polarization and Y the polarization, and then convert an electrical signal into an optical signal and transmit the optical signal to a coherent optical receiver. The coherent optical receiver is configured to convert an optical signal received from an optical fiber into an electrical signal and generate a restoration symbol to restore the electrical signal as an original signal by applying a complex received symbol according to the converted electrical signal to at least one of a complex conjugate block, a digital filter, a symbol delayer, a complex adder, a channel equalizer, and a parallel-to-serial converter.

According to an aspect, there is provided a coherent optical communication system including a coherent optical transmitter configured to place a first transmission symbol and a second transmission symbol including a symbol pair in an X polarization and a Y polarization in an odd-numbered symbol interval, respectively, place the first transmission symbol and the second transmission symbol to cross each other to be different from a position of a transmission symbol that is placed in the odd-numbered symbol interval for the X polarization and the Y polarization in an even-numbered symbol interval, and then perform a negative operation on a transmission symbol placed in the X polarization in the even-numbered symbol interval, perform a complex conjugate operation on a transmission symbol placed in one of the X polarization and the Y polarization among the first transmission symbol and the second transmission symbol that are output from the X polarization and the Y polarization of the coherent optical transmitter, respectively, convert an electrical signal of a complex transmission symbol into an optical signal, and transmit the optical signal to a coherent optical receiver through an optical fiber and a coherent optical receiver configured to generate a restoration symbol to restore the optical signal received from the coherent optical transmitter as an original signal in the coherent optical transmitter. The coherent optical receiver is configured to generate the restoration symbol to restore the optical signal as the original signal by applying the complex received symbol to at least one of a complex conjugate block, a digital filter, a symbol delayer, a complex adder, a channel equalizer, and a parallel-to-serial converter.

The coherent optical receiver may include a digital filter configured to compensate for a channel effect of a complex received symbol using a channel coefficient of a digital filter updated through an equalization algorithm, wherein the digital filter may include a first digital filter not interworking with a complex conjugate block and a second digital filter interworking with a complex conjugate block, a symbol delayer configured to set a delay period of a complex received symbol for which the channel effect is compensated for through the digital filter, wherein the symbol delayer may include a first symbol delayer interworking with the first digital filter and a second symbol delayer interworking with the second digital filter, a complex adder configured to perform a complex addition operation on a complex received symbol for which a time delay is set through the symbol delayer and on a complex received symbol that passes through the digital filter, wherein the complex adder may include a first complex adder interworking with the first symbol delayer and a second complex adder interworking with the second symbol delayer, and a parallel-to-serial converter configured to generate a restoration symbol to restore the optical signal as an original signal in the coherent optical transmitter from a complex received symbol on which the complex addition operation is performed through the complex adder.

In the first digital filter, a complex received symbol received from an optical fiber may be placed, and in the second digital filter, a complex received symbol on which a complex conjugate operation is performed through the complex conjugate block may be placed.

The first complex adder may be configured to perform the complex addition operation on a complex received symbol in the odd-numbered symbol interval for which a time delay is set through the first symbol delayer and the first digital filter and on a complex received symbol in the even-numbered symbol interval on which the complex conjugate operation is performed through the complex conjugate block and the second digital filter.

The second complex adder may be configured to, through the first digital filter, perform a negative operation on a complex received symbol in the even-numbered symbol interval on which the complex conjugate operation is not performed and perform the complex addition operation on a complex received symbol on which the negative operation is performed and on a complex received symbol in the odd-numbered symbol interval on which the complex conjugate operation is performed through the complex conjugate block and the second digital filter.

The coherent optical receiver may include the channel equalizer interworking with the first complex adder and the second complex adder and the channel equalizer may be configured to update each of a channel coefficient of the first digital filter and a channel coefficient of the second digital filter by correcting a complex received symbol on which the complex addition operation is performed through the equalization algorithm.

Additional aspects of embodiments will be set forth in part in the description which follows and, in part, will be apparent from the description, or may be learned by practice of the disclosure.

According to embodiments, a coherent optical communication system may realize a coherent optical receiver of a single polarization type by using a polarization time block code based on orthogonal code.

According to embodiments, a polarization time block decoder in a coherent optical receiver of a single polarization type may reduce the complexity of implementation according to the number of digital filters and the number of channel equalizers compared to the Alamouti code-based polarization time block decoder according to the related art.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Hereinafter, embodiments will be described in detail with reference to the accompanying drawings.

Figure 1:
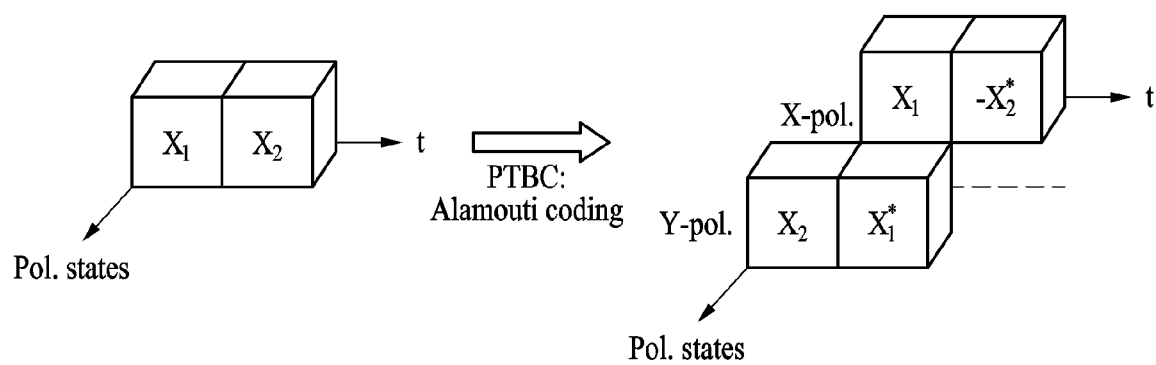
FIG. 1 is a diagram illustrating a concept of an Alamouti-based polarization time block coding scheme according to the related art.
Figure 2A:
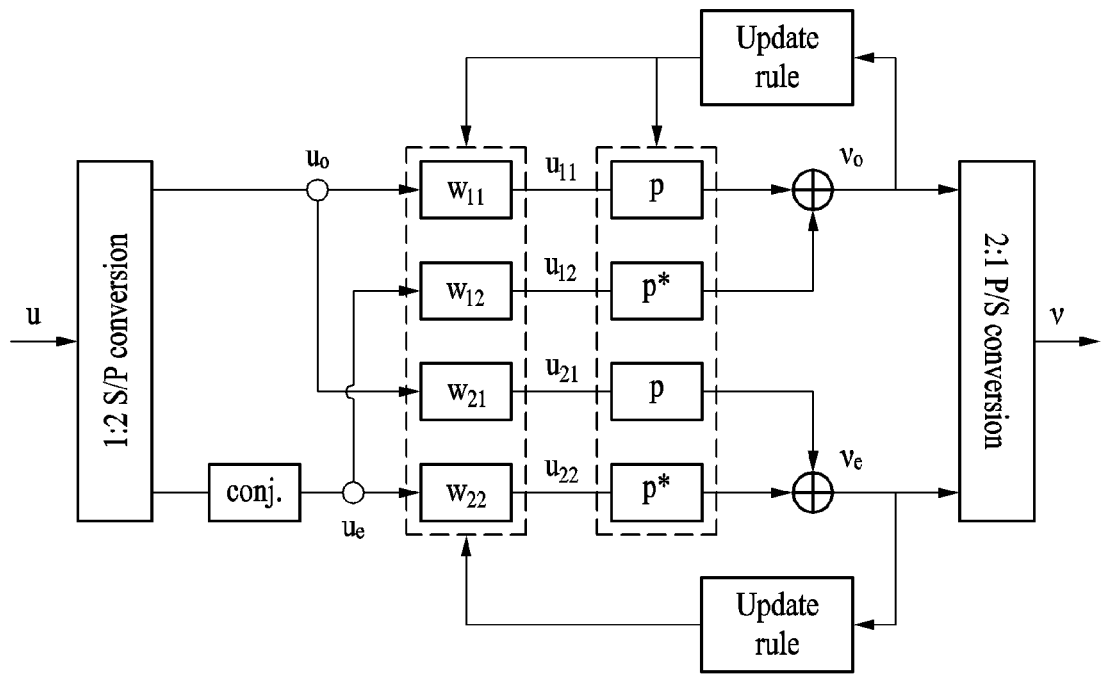
FIGS. 2A and 2B are diagrams illustrating a first structure and a second structure of an Alamouti-based polarization time block code decoder according to the related art.
Figure 2B:
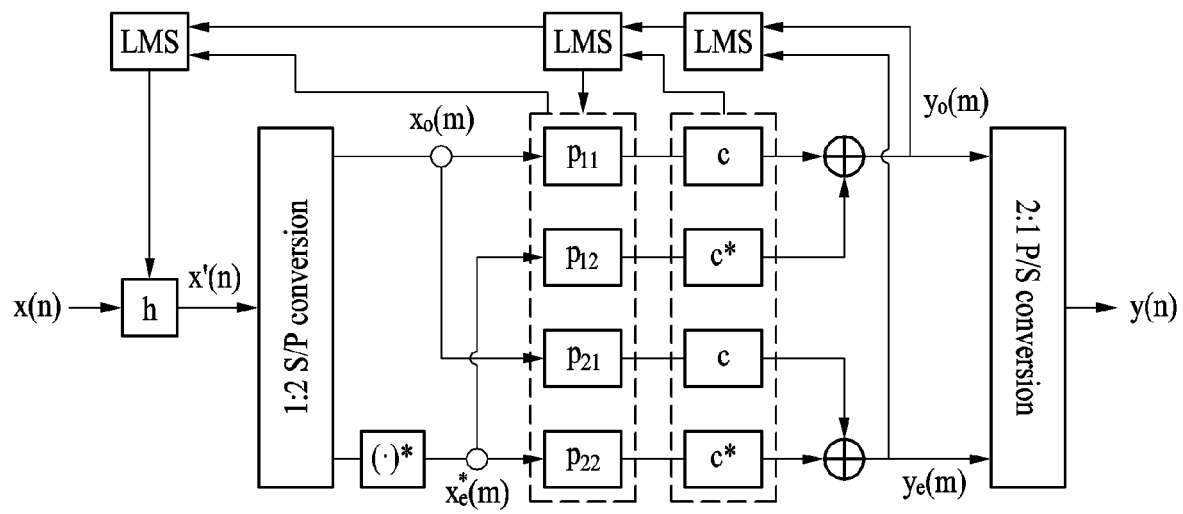
Figure 3:
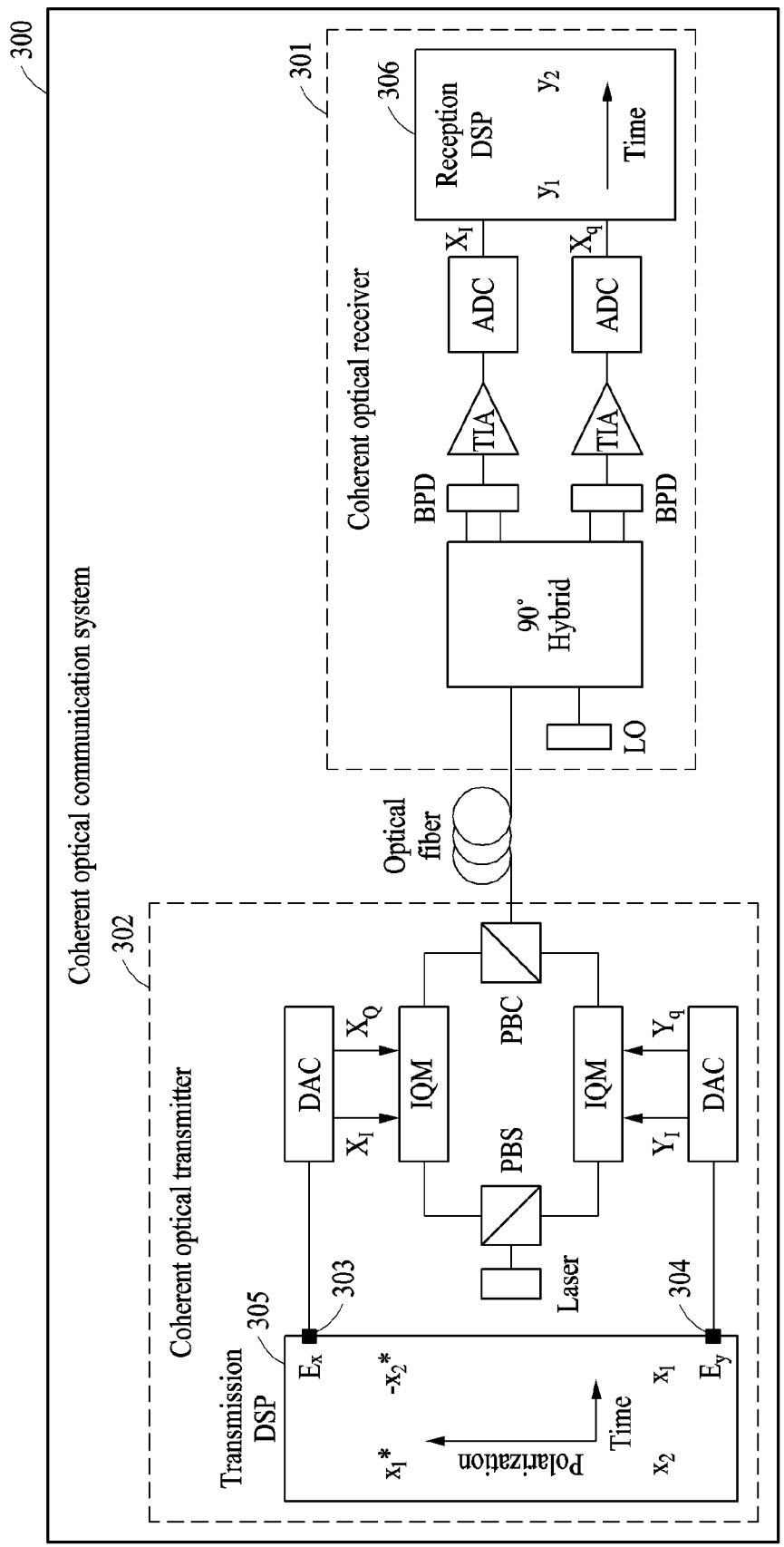
FIG. 3 is a block diagram illustrating a concept of a polarization time block code transmission scheme according to an embodiment.
Figure 4:
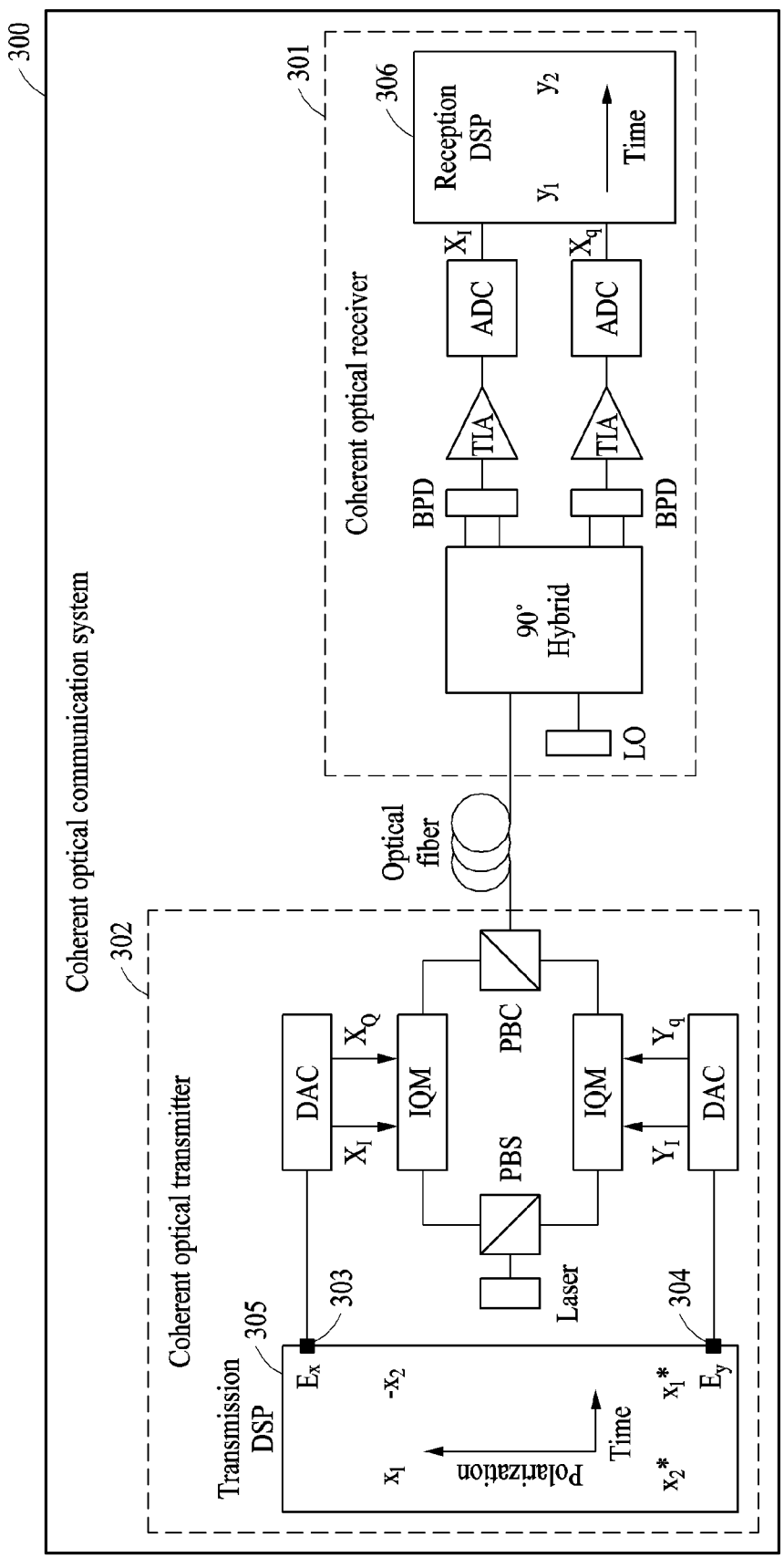
FIG. 4 is a block diagram illustrating the concept of a polarization time block code transmission scheme according to another embodiment.

FIGS. 3 and 4 are block diagrams illustrating a concept of a polarization time block code transmission scheme according to an embodiment.

A coherent optical communication system 300 may include a coherent optical receiver 301 and a coherent optical transmitter 302.

The coherent optical transmitter 302 may include a transmission digital signal processor (DSP) 305, a laser, a digital to analog converter (DAC), an In-phase quadrature modulator (IQM), a polarization beam splitter (PBS), and a polarization beam combiner (PBC).

The coherent optical receiver 301 may include a 90-degree hybrid coupler, a local oscillator (LO), a balanced photodetector (BPD), a trans-impedance amplifier (TIA), an analog to digital converter (ADC), and a receiver DSP 306.

The transmitter DSP 305 of the coherent optical transmitter 302 may have a dual polarization structure and may include a polarization time block coder for transmitting a transmission symbol consecutively provided over time to the coherent optical receiver 301. The transmitter DSP 305 of the coherent optical transmitter 302 may distinguish an odd-numbered symbol interval from an even-numbered symbol interval with respect to the transmission symbol consecutively provided over time.

① the Odd-Numbered Symbol Interval

The transmitter DSP 305 of the coherent optical transmitter 302 may place, respectively, a first transmission symbol and a second transmission symbol including a symbol pair in an X polarization 303 and a Y polarization 304 in an odd-numbered symbol interval. For example, the transmitter DSP 305 of the coherent optical transmitter 302 may place the first transmission symbol $x_1$ in the X polarization 303 and place the second transmission symbol $x_2$ in the Y polarization 304 at a polarization time t corresponding to the odd-numbered symbol interval.

② the Even-Numbered Symbol Interval

The transmitter DSP 305 of the coherent optical transmitter 302 may place the first transmission symbol $x_1$ and the second transmission symbol $x_2$ to cross each other for the X polarization 303 and the Y polarization 304 in an even-numbered symbol interval. In detail, when the first transmission symbol $x_1$ is placed in the X polarization 303 in the odd-numbered symbol interval, the transmitter DSP 305 of the coherent optical transmitter 302 may place the transmission symbols to cross each other so that the second transmission symbol $x_2$ is placed in the X polarization 303 in the even-numbered symbol interval.

For example, the transmitter DSP 305 of the coherent optical transmitter 302 may place the second transmission symbol $x_2$ in the X polarization 303 and may place the first transmission symbol $x_1$ in the Y polarization 304 at a polarization time t+1 corresponding to the even-numbered symbol interval.

The transmitter DSP 305 of the coherent optical transmitter 302 may generate a transmission symbol $-x_2$ on which a negative operation is performed by performing the negative operation on the second transmission symbol $x_2$ placed in the X polarization 303 in the even-numbered symbol interval.

The transmitter DSP 305 of the coherent optical transmitter 302 may perform a complex conjugate operation on a transmission symbol placed in one of the X polarization 303 and the Y polarization 304. For example, referring to FIG. 3, the transmitter DSP 305 of the coherent optical transmitter 302 may perform a complex conjugate operation (*) on the transmission symbols $x_1$ and $-x_2$ placed in the X polarization 303 over time and transmission symbols on which the complex conjugate operation (*) is performed may be represented as $x_1^*$ and $-x_2^*$ in a symbol interval, respectively.

In another example, referring to FIG. 4, the transmitter DSP 305 of the coherent optical transmitter 302 may perform the complex conjugate operation (*) on the transmission symbols $x_2$ and $x_1$ placed in the Y polarization 304 over time and transmission symbols on which the complex conjugate operation (*) is performed may be represented as $x_2^*$ and $x_1^*$ respectively.

The coherent optical transmitter 302 may transmit the first transmission symbol and the second transmission symbol respectively output from the X polarization 303 and the Y polarization 304 to the coherent optical receiver 301 through an optical fiber. That is, the coherent optical transmitter 302 may combine and convert a complex domain electrical signal in the X polarization 303 and the Y polarization 304 output from the transmitter DSP 305 of the coherent optical transmitter 302 over time into an optical signal, and then transmit the optical signal to the coherent optical receiver 301 through an optical fiber.

Referring to FIG. 3, the coherent optical transmitter 302 may combine a signal of the X polarization 303 that is optically modulated to the first transmission symbol $x_1^*$ on which the complex conjugate operation (*) is performed, with a signal of the Y polarization 304 that is optically modulated to the second transmission symbol $x_2$ on which the complex conjugate operation (*) is not performed, for polarization in the odd-numbered symbol interval. In addition, the coherent optical transmitter 302 may combine a signal of the X polarization 303 that is optically modulated to the second transmission symbol $-x_2^*$ on which the complex conjugate operation (*) and the negative operation are performed, with a signal of the Y polarization 304 that is optically modulated to the first transmission symbol $x_1$ on which the complex conjugate operation (*) is not performed, for polarization in the even-numbered symbol interval.

Referring to FIG. 4, the coherent optical transmitter 302 may combine a signal of the X polarization 303 that is optically modulated to the first transmission symbol $x_1$ on which the complex conjugate operation (*) is not performed with a signal of the Y polarization 304 that is optically modulated to the second transmission symbol on which the complex conjugate operation (*) is performed, for polarization in the odd-numbered symbol interval. In addition, the coherent optical transmitter 302 may combine a signal of the X polarization 303 that is optically modulated to the second transmission symbol $-x_2$ on which the complex conjugate operation (*) is not performed but the negative operation is performed, with a signal of the Y polarization 304 that is optically modulated to the first transmission symbol $x_1^*$ on which the complex conjugate operation (*) is performed, for polarization in the even-numbered symbol interval.

The coherent optical transmitter 302 may transmit a combined complex domain optical transmission signal to the coherent optical receiver 301 through an optical fiber.

The coherent optical receiver 301 may receive a complex domain transmission signal from an optical fiber. Here, the complex domain transmission symbol may include a first transmission symbol, a second transmission symbol, a channel coefficient $h_1$ according to the X polarization 303, and a channel coefficient $h_2$ according to the Y polarization 304.

The coherent optical receiver 301 may be implemented as a single polarization received structure and may receive a complex transmission symbol transmitted from an optical fiber as a complex received symbol. In addition, the coherent optical receiver 301 may receive a complex received symbol mapped to an odd-numbered complex transmission symbol as an odd-numbered received symbol $y_1$ and a complex received symbol mapped to an even-numbered complex transmission symbol as an even-numbered received symbol $y_2$.

The coherent optical receiver 301 may include a polarization time block decoder for restoring a complex domain optical transmission signal as an original signal of the coherent optical transmitter 302 using a complex received symbol consecutively received over time. The coherent optical receiver 301 including the polarization time block decoder may generate a restored symbol as the original signal by applying the complex received symbols $y_1$ and $y_2$ to at least one of a complex conjugate block, a digital filter, a symbol delayer, a complex adder, a channel equalizer, and a parallel-to-serial converter.

The detailed operations of the polarization time block decoder are described with reference to FIGS. 5 to 7. Here, the polarization time block decoding scheme is described focusing on a structure of performing a complex conjugate on the Y polarization 304 shown in FIG. 4. In addition, a structure of performing a complex conjugate on the X polarization 303 shown in FIG. 3 may also produce a result similar to the polarization time block decoding scheme to be described below.

The polarization time block coding scheme and the polarization time block decoding scheme may minimize the complexity of the polarization time block decoding scheme of the coherent optical receiver 301 having a single polarization structure by providing an orthogonal code of the present disclosure instead of the Alamouti orthogonal code according to the related art.

Figure 5:
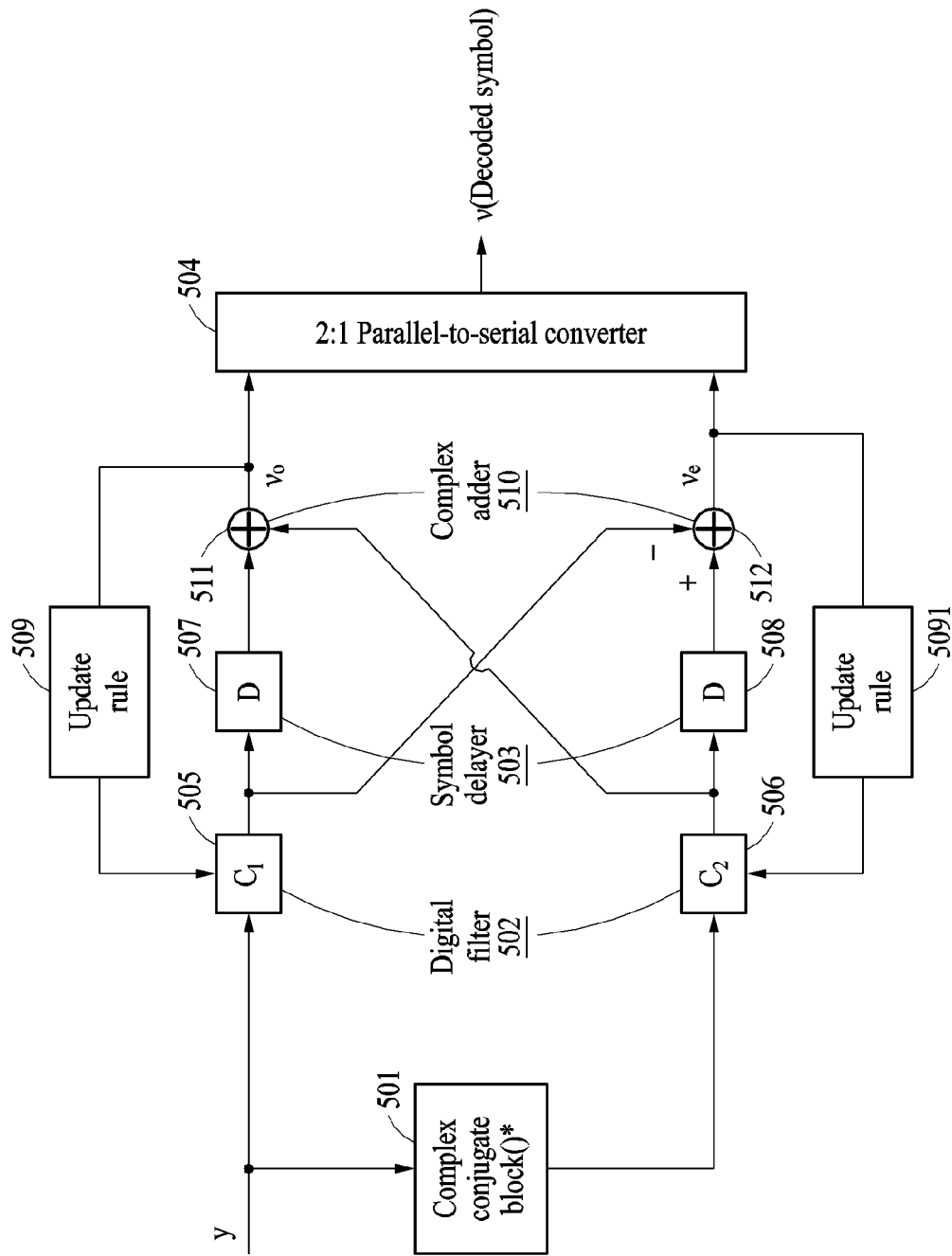
FIG. 5 is a block diagram illustrating a structure of a polarization time block code decoder according to an embodiment.

FIG. 5 is a block diagram illustrating a structure of a polarization time block decoder according to an embodiment.

Referring to FIG. 5, a receiver DSP 500 of the coherent optical receiver 301 may include a digital filter 502, a symbol delayer 503, a complex adder 510, a channel equalizer 509, a channel equalizer 5091 and a parallel-to-serial converter 504, for the polarization time block decoding.

The coherent optical receiver 301 may receive a complex optical transmission signal transmitted through the coherent optical transmitter 302 over time through an optical fiber, may convert a complex domain optical transmission signal into a complex domain electrical signal, and may sequentially receive a complex domain optical transmission signal as the complex received symbols $y_1$ and $y_2$, and the complex received symbols $y_1$ and $y_2$ may include the channel coefficient $h_1$ according to a transmission symbol of the coherent optical transmitter 302 and the X polarization 303, the channel coefficient $h_2$ according to the Y polarization 304, and noise due to an optical fiber channel.

For example, the complex received symbol $y_1$ may be a complex received symbol in the odd-numbered symbol interval. In addition, the complex received symbol $y_2$ may be a complex received symbol in the even-numbered symbol interval. That is, the odd-numbered complex received symbol received from the coherent optical receiver 301 may be defined as $y_1$ and the even-numbered complex received symbol received from the coherent optical receiver 301 may be defined as $y_2$. The complex received symbols $y_1$ and $y_2$ may be represented as Equation 3 below.

$$y_1 = [h_1 \; h_2]\begin{bmatrix} x_1 \\ x_2^* \end{bmatrix} + n_1 \qquad \text{[Equation 3]}$$

$$y_2 = [h_2 \; -h_1]\begin{bmatrix} x_1^* \\ x_2 \end{bmatrix} + n_2$$

Referring to Equation 3, the complex received symbols $y_1$ and $y_2$ denote a relationship between the channel coefficients $h_1$ and $h_2$ of the corresponding polarization and transmission symbols according to the channel coefficients $h_1$ and $h_2$. $n_1$ and $n_2$ denote channel noise applied to the odd-numbered and the even-numbered received symbols.

In the coherent optical receiver 301, the odd-numbered symbol interval and the even-numbered symbol interval may be repeated and sequentially input to the digital filter 502. Here, the digital filter 502 may have a multi-tap structure or single-tap structure. The digital filter 502 may compensate for a channel effect of a complex received symbol received from the coherent optical transmitter 302 using channel coefficients $c_1$ and $c_2$ of a digital filter updated through an equalization algorithm.

The digital filter 502 may include a first digital filter 505 not interworking with a complex conjugate block 501 and a second digital filter 506 interworking with the complex conjugate block 501. Here, in the first digital filter 505, a complex received symbol received from the coherent optical receiver 302 may be placed, and in the second digital filter 506, a complex received symbol on which a complex conjugate operation (*) is performed through the complex conjugate block 501 may be placed.

The complex conjugate block 501 may perform a complex conjugate operation (*) on complex received symbols and each of the complex received symbols $y_1^*$ and $y_2^*$ on which the complex conjugate operation (*) is performed may be represented as Equation 4 below.

$$y_1^* = [h_1^* \; h_2^*]\begin{bmatrix} x_1^* \\ x_2 \end{bmatrix} + n_1^* \qquad \text{[Equation 4]}$$

$$y_2^* = [h_2^* \; -h_1^*]\begin{bmatrix} x_1 \\ x_2^* \end{bmatrix} + n_2^*$$

Referring to Equation 4, the coherent optical receiver 301 may apply a complex conjugate to all the channel coefficients $h_1$ and $h_2$, and the transmission symbols and the noise 11 and 12 in the channel coefficients $h_1$ and $h_2$ of the corresponding polarization.

For example, the coherent optical receiver 301 may equally place the complex received symbol of the odd-numbered symbol interval in the first digital filter 505 and the second digital filter 506. When the complex received symbol of the odd-numbered symbol interval is placed in the digital filter 502, the coherent optical receiver 301 may equally place the complex received symbol of the even-numbered symbol interval in the first digital filter 505 and the second digital filter 506, consecutively.

The symbol delayer 503 may delay, by one symbol interval, a complex received symbol for which the channel effect is compensated for through the digital filter 502. In more detail, the symbol delayer 503 may be a symbol level signal having one value for each complex received symbol that passes through the digital filter 502 or an oversampled symbol, and the symbol delayer 503 may delay an input signal by a symbol time interval.

Here, the symbol delayer 503 may include a first symbol delayer 507 interworking with the first digital filter 505 and a second symbol delayer 508 interworking with the second digital filter 506. The first symbol delayer 507 may delay, by one symbol interval, a complex received symbol on which a complex conjugate operation (*) is not performed through the first digital filter 505 and the second symbol delayer 508 may delay, by one symbol interval, a complex received symbol on which a complex conjugate operation (*) is performed through the complex conjugate block 501 and the second digital filter 506.

The complex adder 510 may perform a complex addition operation on a complex received symbol for which a time delay is set through the symbol delayer 503 and a complex received symbol that passes through the digital filter 502. The complex adder 510 may include a first complex adder 511 interworking with the first symbol delayer 507 and a second complex adder 512 interworking with the second symbol delayer 508.

The first complex adder 511 may perform a complex addition operation on a complex received symbol in the odd-numbered symbol interval for which a time delay is set through the first symbol delayer 507 and the first digital filter 505 and on a complex received symbol in the even-numbered symbol interval on which a complex conjugate operation (*) is performed through the complex conjugate block 501 and the second digital filter 506.

The second complex adder 512 may perform a negative operation on a complex received symbol of the even-numbered symbol interval on which a complex conjugate operation (*) is not performed through the first digital filter 505. The second complex adder 512 may perform a complex addition operation on a complex received symbol on which the negative operation is performed and on a complex received symbol of the odd-numbered symbol interval on which a complex conjugate operation (*) is performed through the complex conjugate block 501 and the second digital filter 506.

The receiver DSP 500 of the coherent optical receiver 301 may perform polarization time block decoding processes, and this series of processes may be described by the Equations below.

$$Y = \begin{bmatrix} y_1 \\ y_2^* \end{bmatrix} = \begin{bmatrix} h_1 & h_2 \\ h_2^* & -h_1^* \end{bmatrix} \begin{bmatrix} x_1 \\ x_2^* \end{bmatrix} + \begin{bmatrix} n_1 \\ n_2^* \end{bmatrix} \quad \text{[Equation 5]}$$

$$Y^* = \begin{bmatrix} y_1^* \\ y_2 \end{bmatrix} = \begin{bmatrix} h_1^* & h_2^* \\ h_2 & -h_1 \end{bmatrix} \begin{bmatrix} x_1^* \\ x_2 \end{bmatrix} + \begin{bmatrix} n_1^* \\ n_2 \end{bmatrix}$$

Referring to Equation 5, a received symbol vector Y for an odd-numbered complex received symbol and an even-numbered complex received symbol on which a complex conjugate operation (*) is performed denotes a 2×2 MIMO system having an $H_1$ channel matrix as shown in Equation 6 below.

$$H_1 = \begin{bmatrix} h_1 & h_2 \\ h_2^* & -h_1^* \end{bmatrix} \quad \text{[Equation 6]}$$

In addition, a received symbol vector Y* for the odd-numbered complex received symbol on which a complex conjugate operation (*) is performed and for an even-numbered complex received symbol denotes a 2×2 MIMO system having an $H_2$ channel matrix as shown in Equation 7 below.

$$H_2 = \begin{bmatrix} h_1^* & h_2^* \\ h_2 & -h_1 \end{bmatrix} \quad \text{[Equation 7]}$$

The receiver DSP 500 of the coherent optical receiver 301 may set an estimated channel coefficient for restoring an original signal using the received symbol vectors Y and Y* of Equation 5 as Equation 8 below.

$$w_1 = \frac{1}{\|h\|} \begin{bmatrix} h_1 \\ h_2^* \end{bmatrix} \quad \text{[Equation 8]}$$

$$w_2 = \frac{1}{\|h\|} \begin{bmatrix} h_2^* \\ -h_1 \end{bmatrix}$$

$$w_1 = \frac{1}{\|h\|} \begin{bmatrix} h_1 \\ h_2^* \end{bmatrix}$$

$$w_2 = \frac{1}{\|h\|} \begin{bmatrix} h_2^* \\ -h_1 \end{bmatrix}$$

Here, $\|h\|$ denotes $\sqrt{|h_1|^2+|h_2|^2}$. The coherent optical receiver 301 may restore original symbols $v_o$ and $v_e$ as shown in Equation 9 below, by operating channel coefficients $w_1$ and $w_2$ of an estimated polarization with the received symbol vectors Y and Y* in Equation 5.

$$w_1^H Y = \begin{bmatrix} \frac{h_1^*}{\|h\|} & \frac{h_2}{\|h\|} \end{bmatrix} \begin{bmatrix} y_1 \\ y_2^* \end{bmatrix} = \begin{bmatrix} \frac{h_1^*}{\|h\|} & \frac{h_2}{\|h\|} \end{bmatrix} \begin{bmatrix} h_1 & h_2 \\ h_2^* & -h_1^* \end{bmatrix} \begin{bmatrix} x_1 \\ x_2^* \end{bmatrix} + \quad \text{[Equation 9]}$$

$$w_1^H n = [\|h\| \quad 0] \begin{bmatrix} x_1 \\ x_2^* \end{bmatrix} + w_1^H n = \|h\|x_1 + w_1^H n = v_o$$

$$w_2^H Y^* = \begin{bmatrix} \frac{h_2}{\|h\|} & \frac{-h_1^*}{\|h\|} \end{bmatrix} \begin{bmatrix} y_1^* \\ y_2 \end{bmatrix} = \begin{bmatrix} \frac{h_2}{\|h\|} & \frac{-h_1^*}{\|h\|} \end{bmatrix} \begin{bmatrix} h_1^* & h_2^* \\ h_2 & -h_1 \end{bmatrix} \begin{bmatrix} x_1^* \\ x_2 \end{bmatrix} +$$

$$w_2^H n^* = [0 \quad \|h\|] \begin{bmatrix} x_1^* \\ x_2 \end{bmatrix} + w_2^H n^* = \|h\|x_2 + w_2^H n^* = v_e$$

Referring to Equation 9, $$n = \begin{bmatrix} n_1 \\ n_2^* \end{bmatrix}, n^* = \begin{bmatrix} n_1^* \\ n_2 \end{bmatrix},$$

and $(-)^H$ denote a conjugate transpose matrix. Here, the symbol $v_o$ may correspond to a restored symbol of the first transmission symbol of the coherent optical receiver 302 and the symbol $v_e$ may correspond to a restored symbol of the second transmission symbol of the coherent optical receiver 302.

Coefficients $c_1$ and $c_2$ of the digital filter 502 for configuring the channel coefficients $w_1$ and $w_2$ of the estimated polarization may be represented as Equation 10 below.

$$c_1 = \frac{h_1^*}{\|h\|}, c_2 = \frac{h_2}{\|h\|} \quad \text{[Equation 10]}$$

The channel equalizer 509 may detect results on which a complex addition operation is performed, and then may update a coefficient of the first digital filter 505 using an adaptive equalization algorithm such as a least mean sequence (LMS). The channel equalizer 5091 may detect results on which a complex addition operation is performed, and then may update a coefficient of the second digital filter 506 for the odd-numbered complex received symbol on which the complex conjugate operation (*) is performed with the even-numbered complex received symbol.

The coherent optical receiver 301 may generate a decoded symbol $\mathcal{V}$ for restoring an original signal from the original symbols $v_o$ and $v_e$ on which an addition operation is performed through the parallel-to-serial converter 504. Here, the parallel-to-serial converter 504 is a 2:1 parallel-to-serial converter and the coherent optical receiver 301 may finally define the decoded symbol $\mathcal{V}$ as shown in Equation 11 below.

$$\mathcal{V} = [v_o v_e]^T = [\widetilde{x_1} \quad \widetilde{x_2}]^T \quad \text{[Equation 11]}$$

The coherent optical receiver 301 may restore the original signals $x_1$ and $x_2$ transmitted and received from a coherent optical communication system by finally generating the decoded symbol $\mathcal{V}$.

Figure 6:
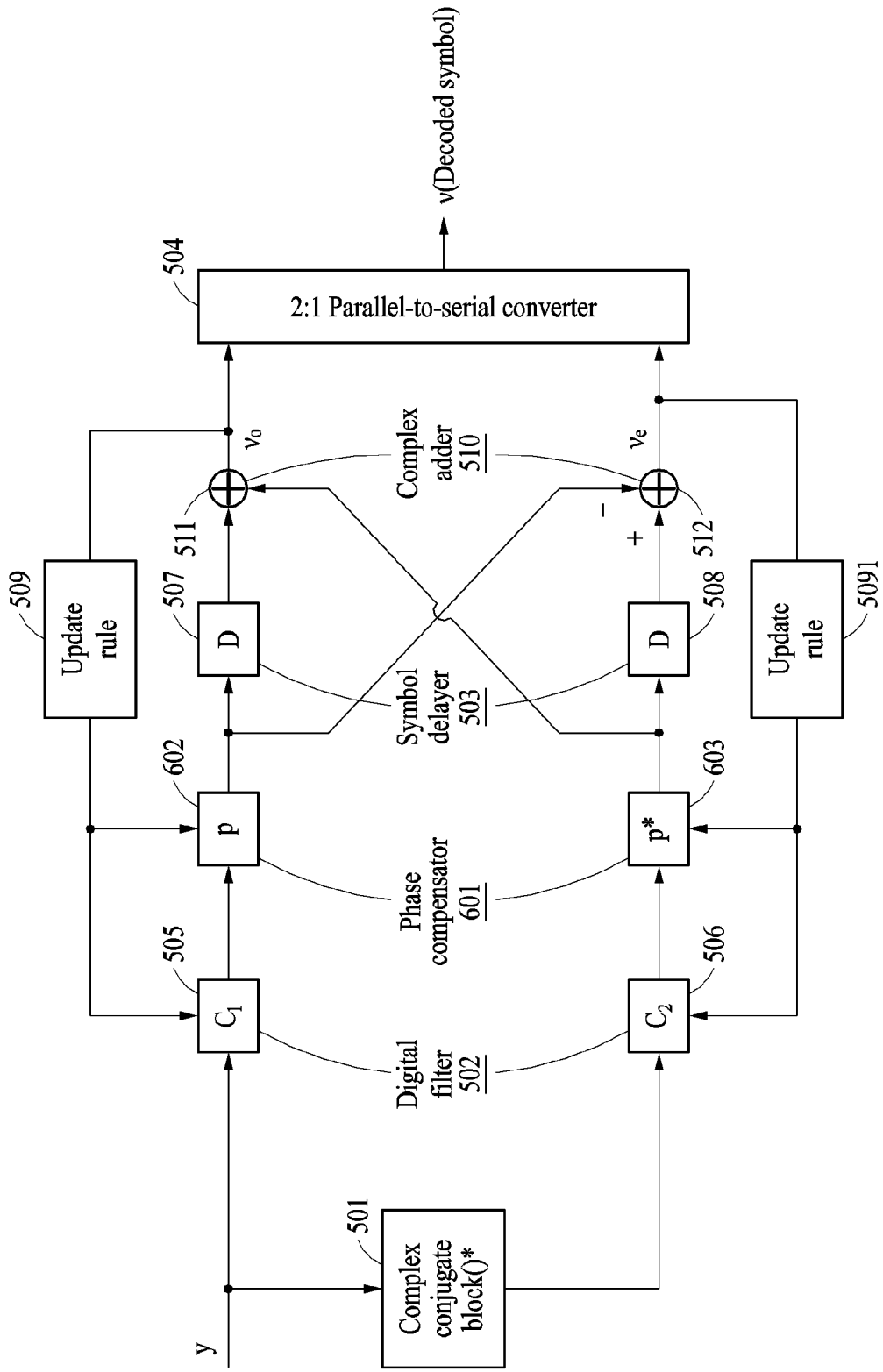
FIG. 6 is a block diagram illustrating the structure of a polarization time block code decoder according to another embodiment.

FIG. 6 is a block diagram illustrating the structure of a polarization time block decoder according to another embodiment.

Referring to FIG. 6, the coherent optical receiver 301 may operate in the same manner as that of FIG. 5 when performing the polarization time block decoding scheme. Here, the receiver DSP 500 of the coherent optical receiver 301 may restore the phase of a received symbol by adding a phase compensator 601 for the polarization time block decoding.

The phase compensator 601 may be placed between the digital filter 502 and the symbol delayer 503, and the phase compensator 601 may restore the phase of a received symbol for which the channel effect is compensated for through the digital filter 502. In addition, the phase compensator 601 may be implemented as a single-tap structure and may include a first phase compensator p 602 interworking with the first digital filter 505 and a second phase compensator p* 603 interworking with the second digital filter 507. The second phase compensator p* 603 may perform a complex conjugate operation (*)

The first phase compensator p 602 may correct the phase of a complex received symbol for which the channel effect is compensated for through the first digital filter 505. In addition, the second phase compensator p* 603 may correct the phase of a complex received symbol for which the channel effect is compensated through the second digital filter 506.

Accordingly, the coherent optical receiver 301 may improve the performance for generating a decoded symbol by correcting phases of received symbols through the phase compensator 601. In the coherent optical receiver 301, the phase compensator 601 may also update a phase compensation coefficient by an adaptive equalization algorithm such as an LMS like the digital filter 502 through the channel equalizer 509 and the channel equalizer 5091.

Figure 7:
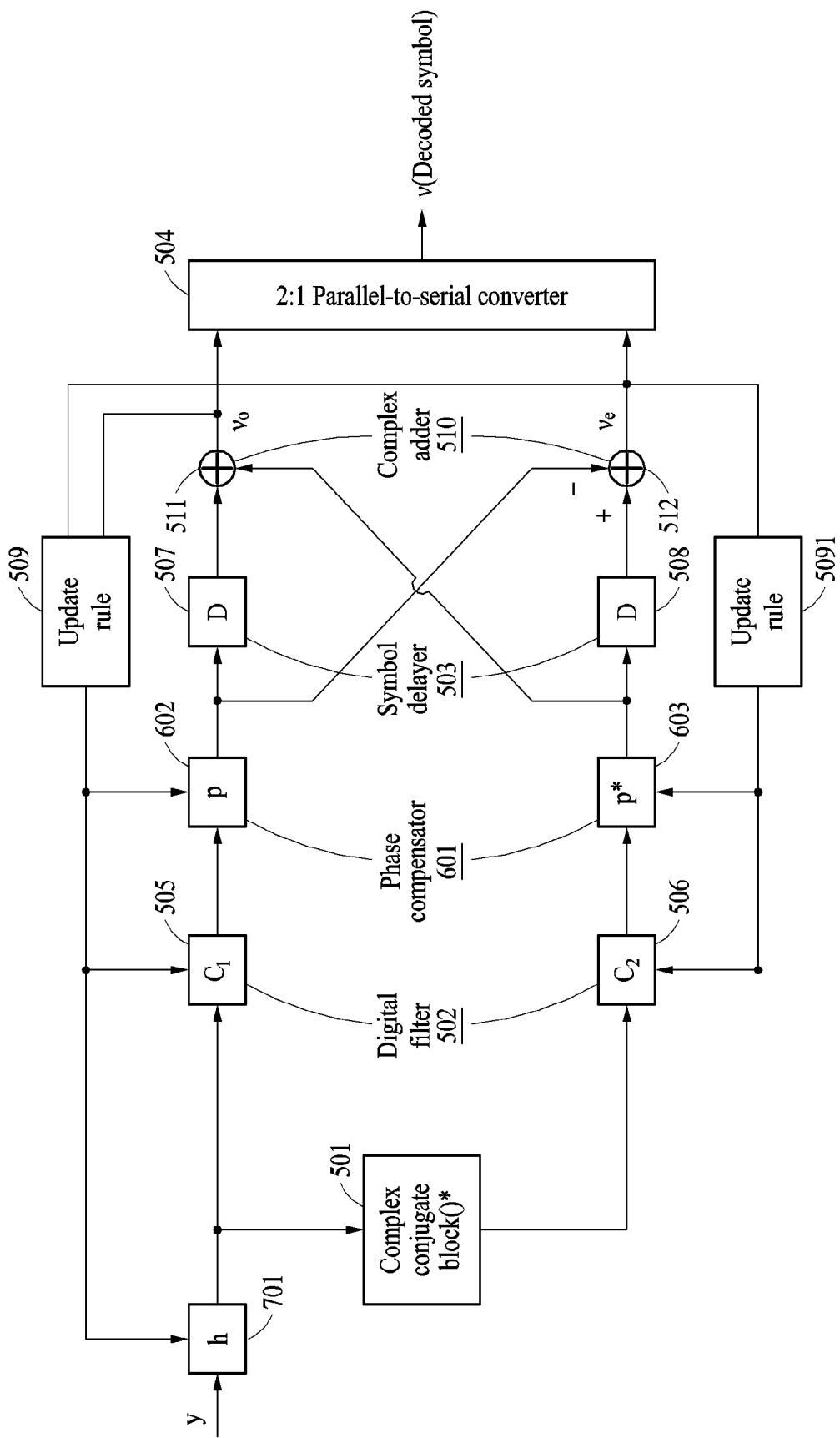
FIG. 7 is a block diagram illustrating the structure of a polarization time block code decoder according to another embodiment.

FIG. 7 is a block diagram illustrating the structure of a polarization time block decoder according to another embodiment.

Referring to FIG. 7, the coherent optical receiver 301 may operate in the same manner as that of FIG. 6 when performing the polarization time block decoding scheme. Here, the receiver DSP 500 of the coherent optical receiver 301 may compensate for the channel effect through a channel compensator 701 before a complex received symbol is placed on the digital filter 502 by adding the channel compensator 701. The coherent optical receiver 301 may reduce the complexity of the digital filter 502 by pre-compensating for the channel effect of the complex receive symbol.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to embodiments may be written in a computer-executable program and may be implemented as various recording media such as magnetic storage media, optical reading media, or digital storage media.

Various techniques described herein may be implemented in digital electronic circuitry, computer hardware, firmware, software, or combinations thereof. The implementations may be achieved as a computer program product, i.e., a computer program tangibly embodied in an information carrier, e.g., in a machine-readable storage device (for example, a computer-readable medium) or in a propagated signal, for processing by, or to control an operation of, a data processing apparatus, e.g., a programmable processor, a computer, or multiple computers. A computer program, such as the computer program(s) described above, may be written in any form of a programming language, including compiled or interpreted languages, and may be deployed in any form, including as a stand-alone program or as a module, a component, a subroutine, or other units suitable for use in a computing environment. A computer program may be deployed to be processed on one computer or multiple computers at one site or distributed across multiple sites and interconnected by a communication network.

Processors suitable for processing of a computer program include, by way of example, both general and special purpose microprocessors, and any one or more processors of any kind of digital computer. Generally, a processor will receive instructions and data from a read-only memory or a random-access memory, or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Examples of information carriers suitable for embodying computer program instructions and data include semiconductor memory devices, e.g., magnetic media such as hard disks, floppy disks, and magnetic tape, optical media such as compact disk read only memory (CD-ROM) or digital video disks (DVDs), magneto-optical media such as floptical disks, read-only memory (ROM), random-access memory (RAM), flash memory, erasable programmable ROM (EPROM), or electrically erasable programmable ROM (EEPROM). The processor and the memory may be supplemented by, or incorporated in special purpose logic circuitry.

In addition, non-transitory computer-readable media may be any available media that may be accessed by a computer and may include both computer storage media and transmission media.

Although the present specification includes details of a plurality of specific embodiments, the details should not be construed as limiting any invention or a scope that can be claimed, but rather should be construed as being descriptions of features that may be peculiar to specific embodiments of specific inventions. Specific features described in the present specification in the context of individual embodiments may be combined and implemented in a single embodiment. On the contrary, various features described in the context of a single embodiment may be implemented in a plurality of embodiments individually or in any appropriate sub-combination. Furthermore, although features may operate in a specific combination and may be initially depicted as being claimed, one or more features of a claimed combination may be excluded from the combination in some cases, and the claimed combination may be changed into a sub-combination or a modification of the sub-combination.

Likewise, although operations are depicted in a specific order in the drawings, it should not be understood that the operations must be performed in the depicted specific order or sequential order or all the shown operations must be performed in order to obtain a preferred result. In specific cases, multitasking and parallel processing may be advantageous. In addition, it should not be understood that the separation of various device components of the aforementioned embodiments is required for all the embodiments, and it should be understood that the aforementioned program components and apparatuses may be integrated into a single software product or packaged into multiple software products.

The embodiments disclosed in the present specification and the drawings are intended merely to present specific examples in order to aid in understanding of the present disclosure, but are not intended to limit the scope of the present disclosure. It will be apparent to one of ordinary skill in the art that various modifications based on the technical spirit of the present disclosure, as well as the disclosed embodiments, can be made.

What is claimed is:

1. A coherent optical receiver comprising:
a digital filter configured to compensate for a channel effect of a complex received symbol received from a coherent optical transmitter using a channel coefficient of a digital filter updated through an equalization algorithm, wherein the digital filter is a multi-tap digital filter having a multi-tap or a single-tap digital filter having a single-tap and comprises a first digital filter not interworking with a complex conjugate block and a second digital filter interworking with a complex conjugate block;
a symbol delayer configured to set a delay period of a complex received symbol for which the channel effect is compensated for through the digital filter, wherein the symbol delayer comprises a first symbol delayer interworking with the first digital filter and a second symbol delayer interworking with the second digital filter;
a complex adder configured to perform a complex addition operation on a complex received symbol for which a time delay is set through the symbol delayer and a complex received symbol that passes through the digital filter, wherein the complex adder comprises a first complex adder interworking with the first symbol delayer and a second complex adder interworking with the second symbol delayer;
a channel equalizer configured to correct a coefficient of the digital filter according to a channel change using a complex received symbol on which the complex addition operation is performed, by interworking with the complex adder; and
a parallel-to-serial converter configured to convert symbols in series recovered from a complex received symbol on which an addition operation is performed through the complex adder,
wherein the coherent optical transmitter is configured to place a first transmission symbol and a second transmission symbol comprising a symbol pair in an X polarization and a Y polarization in an odd-numbered symbol interval, respectively, place the first transmission symbol and the second transmission symbol to cross each other to be different from a position of a transmission symbol that is placed in the odd-numbered symbol interval for the X polarization and the Y polarization in an even-numbered symbol interval, and then perform a negative operation on a transmission symbol placed in the X polarization in the even-numbered symbol interval and perform a complex conjugate operation on a transmission symbol placed in one of the X polarization and the Y polarization.

2. The coherent optical receiver of claim 1, wherein:
in the first digital filter, a complex received symbol input from the coherent optical transmitter is placed, and in the second digital filter, a complex received symbol obtained by performing a complex conjugate operation through the complex conjugate block is placed.

3. The coherent optical receiver of claim 2, wherein the first complex adder is configured to perform a complex addition operation on a complex received symbol in the odd-numbered symbol interval for which a time delay is set through the first symbol delayer and the first digital filter and on a complex received symbol in an even-numbered symbol interval on which a complex conjugate operation is performed through the complex conjugate block and the second digital filter.

4. The coherent optical receiver of claim 2, wherein the second complex adder is configured to:
perform a negative operation on an even-numbered symbol interval complex received symbol in an even-numbered symbol interval on which a complex conjugate operation is not performed through the first digital filter; and
perform a complex addition operation on a complex received symbol on which the negative operation is performed and on a complex received symbol in an odd-numbered symbol interval on which a complex conjugate operation is performed through the complex conjugate block and the second digital filter.

5. The coherent optical receiver of claim 1, wherein the symbol delayer is configured to delay each complex received symbol that passes through the digital filter by one symbol interval.

6. The coherent optical receiver of claim 1, further comprising:
a phase compensator configured to restore a phase of a complex received symbol for which the channel effect is compensated for through the digital filter,
wherein the phase compensator comprises a first phase compensator interworking with the first digital filter and a second phase compensator interworking with the second digital filter to perform a phase compensation operation,
wherein the first phase compensator and the second phase compensator are configured to receive a phase compensation coefficient through the channel equalizer.

7. The coherent optical receiver of claim 1, further comprising:
a channel compensator configured to compensate for the channel effect of the complex received symbol,
wherein the channel compensator is configured to receive a channel coefficient of a digital filter updated according to a channel change through the channel equalizer.

8. A coherent optical transmitter comprising:
a polarization time block coder configured to:
place a first transmission symbol and a second transmission symbol comprising a symbol pair in an X polarization and a Y polarization in an odd-numbered symbol interval, respectively, and place the first transmission symbol and the second transmission symbol to cross each other to be different from a position of a transmission symbol that is placed in the odd-numbered symbol interval for the X polarization and the Y polarization in an even-numbered symbol interval;
perform a negative operation on a transmission symbol placed in the X polarization in the even-numbered symbol interval; and
perform a complex conjugate operation on a transmission symbol placed in one of the X polarization and Y the polarization, and then convert an electrical signal into an optical signal and transmit the optical signal to a coherent optical receiver, wherein the coherent optical receiver is configured to convert an optical signal received from an optical fiber into an electrical signal and generate a restoration symbol to restore the electrical signal as an original signal by applying a complex received symbol according to the converted electrical signal to at least one of a complex conjugate block, a digital filter, a symbol delayer, a complex adder, a channel equalizer, and a parallel-to-serial converter.

9. A coherent optical communication system comprising:
a coherent optical transmitter configured to place a first transmission symbol and a second transmission symbol comprising a symbol pair in an X polarization and a Y polarization in an odd-numbered symbol interval, respectively, place the first transmission symbol and the second transmission symbol to cross each other to be different from a position of a transmission symbol that is placed in the odd-numbered symbol interval for the X polarization and the Y polarization in an even-numbered symbol interval, and then perform a negative operation on a transmission symbol placed in the X polarization in the even-numbered symbol interval, perform a complex conjugate operation on a transmission symbol placed in one of the X polarization and the Y polarization among the first transmission symbol and the second transmission symbol that are output from the X polarization and the Y polarization of the coherent optical transmitter, respectively, convert an electrical signal of a complex transmission symbol into an optical signal, and transmit the optical signal to a coherent optical receiver through an optical fiber; and
a coherent optical receiver configured to generate a restoration symbol to restore the optical signal received from the coherent optical transmitter as an original signal in the coherent optical transmitter, wherein the coherent optical receiver is configured to generate the restoration symbol to restore the optical signal as the original signal by applying the complex received symbol to at least one of a complex conjugate block, a digital filter, a symbol delayer, a complex adder, a channel equalizer, and a parallel-to-serial converter.

10. The coherent optical communication system of claim 9, wherein the coherent optical receiver comprises:
a digital filter configured to compensate for a channel effect of a complex received symbol using a channel coefficient of a digital filter updated through an equalization algorithm, wherein the digital filter comprises a first digital filter not interworking with a complex conjugate block and a second digital filter interworking with a complex conjugate block;
a symbol delayer configured to set a delay period of a complex received symbol for which the channel effect is compensated for through the digital filter, wherein the symbol delayer comprises a first symbol delayer interworking with the first digital filter and a second symbol delayer interworking with the second digital filter;
a complex adder configured to perform a complex addition operation on a complex received symbol for which a time delay is set through the symbol delayer and on a complex received symbol that passes through the digital filter, wherein the complex adder comprises a first complex adder interworking with the first symbol delayer and a second complex adder interworking with the second symbol delayer; and
a parallel-to-serial converter configured to generate a restoration symbol to restore the optical signal as an original signal in the coherent optical transmitter from a complex received symbol on which the complex addition operation is performed through the complex adder.

11. The coherent optical communication system of claim 10, wherein:
in the first digital filter, a complex received symbol received from an optical fiber is placed, and
in the second digital filter, a complex received symbol on which a complex conjugate operation is performed through the complex conjugate block is placed.

12. The coherent optical communication system of claim 11, wherein the first complex adder is configured to perform the complex addition operation on a complex received symbol in the odd-numbered symbol interval for which a time delay is set through the first symbol delayer and the first digital filter and on a complex received symbol in the even-numbered symbol interval on which the complex conjugate operation is performed through the complex conjugate block and the second digital filter.

13. The coherent optical communication system of claim 11, wherein the second complex adder is configured to:
through the first digital filter, perform a negative operation on a complex received symbol in the even-numbered symbol interval on which the complex conjugate operation is not performed; and
perform the complex addition operation on a complex received symbol on which the negative operation is performed and on a complex received symbol in the odd-numbered symbol interval on which the complex conjugate operation is performed through the complex conjugate block and the second digital filter.

14. The coherent optical communication system of claim 10, wherein:
the coherent optical receiver comprises the channel equalizer interworking with the first complex adder and the second complex adder, and
the channel equalizer is configured to update each of a channel coefficient of the first digital filter and a channel coefficient of the second digital filter by correcting a complex received symbol on which the complex addition operation is performed through the equalization algorithm.

* * * * *